(12) United States Patent
Whale

(10) Patent No.: US 9,476,999 B2
(45) Date of Patent: Oct. 25, 2016

(54) SEISMIC IMAGING

(71) Applicant: SHELL OIL COMPANY, Houston, TX (US)

(72) Inventor: Robert Harold Whale, Calgary (CA)

(73) Assignee: Shell Oil Company, Houston, TX (US)

( * ) Notice: Subject to any disclaimer, the term of this patent is extended or adjusted under 35 U.S.C. 154(b) by 35 days.

(21) Appl. No.: 14/405,737

(22) PCT Filed: Jun. 3, 2013

(86) PCT No.: PCT/US2013/043823
§ 371 (c)(1),
(2) Date: Dec. 4, 2014

(87) PCT Pub. No.: WO2013/184542
PCT Pub. Date: Dec. 12, 2013

(65) Prior Publication Data
US 2015/0153467 A1    Jun. 4, 2015

Related U.S. Application Data

(60) Provisional application No. 61/655,058, filed on Jun. 4, 2012.

(51) Int. Cl.
*G01V 1/34*    (2006.01)
*G01V 1/00*    (2006.01)

(52) U.S. Cl.
CPC ............... *G01V 1/345* (2013.01); *G01V 1/003* (2013.01); *G01V 2210/74* (2013.01)

(58) Field of Classification Search
CPC ... G01V 1/003; G01V 1/345; G01V 2210/74
USPC ..................................... 367/36, 37
See application file for complete search history.

(56) References Cited

U.S. PATENT DOCUMENTS

| | | |
|---|---|---|
| 3,278,893 A | 10/1966 | Silverman |
| 3,353,624 A | 11/1967 | Redding |
| 4,232,378 A | 11/1980 | Adams et al. |
| 4,847,813 A | 7/1989 | Alam et al. |
| 4,881,209 A | 11/1989 | Bloomquist et al. |
| 7,110,900 B2 | 9/2006 | Adler et al. |
| 7,164,619 B2 | 1/2007 | Robertsson et al. |
| 2007/0214663 A1 | 9/2007 | Pica |
| 2009/0274005 A1 | 11/2009 | Hansteen et al. |

OTHER PUBLICATIONS

PCT International Search Report, Application No. PCT/US2013/043826 dated Aug. 8, 2013.

*Primary Examiner* — Daniel L Murphy

(57) ABSTRACT

A method of imaging a subterranean formation. The method includes emitting a primary wave from a source point, such that a portion of the primary wave travels into the subterranean formation and is refracted along a geologic layer in the subterranean formation and then emitted as a secondary wave from a refraction point on a boundary between the geologic layer and another geologic layer. The method also includes allowing a portion of the secondary wave to be reflected from a first reflection point as a tertiary wave. The method further includes allowing a portion of the tertiary wave to be reflected from a second reflection point as a quaternary wave, and collecting data about the quaternary wave at an observation point.

17 Claims, 2 Drawing Sheets

SEISMIC IMAGING

PRIORITY CLAIM

The present application is a National Stage (§371) application of PCT/US2013/043823, filed Jun. 3, 2013, which claims the benefit of U.S. Provisional Application No. 61/655,058, filed Jun. 4, 2012, both of which are incorporated herein by reference.

FIELD OF THE INVENTION

The invention relates to a method of imaging a subterranean formation using seismic refractions plus reflections.

BACKGROUND

Certain geologic features in shallow subsurface, such as faults or sinkholes may be hazardous to the stability of surface structures, such as mines, dams, and buildings. In order to mitigate the hazards associated with such geologic features, subterranean formations may be surveyed and imaged.

As shown in FIG. 1, imaging a subterranean formation 100 with geophones may involve sending a primary wave 102 down below the earth's surface 104. The primary wave 102 may be generated from a seismic energy source, and the primary wave 102 may be a compressional or a shear wave. The energy from the primary wave 102 may be reflected at a reflection point 106 as a secondary wave 108. The reflection may be recorded by geophones placed at a secondary wave observation point 110 at the earth's surface 104. The data collected by the geophones may then be processed to image geologic features of the subterranean formation 100. Additional geophones may be present, allowing further data collection. For example, as illustrated in FIG. 1, a geophone may be present at an additional secondary wave observation point 110', such that a portion 102' of the primary wave 102 may be reflected at another reflection point 106' as an additional secondary wave 108'. Geophones used to collect measurements may be placed at a predetermined distance from a source point 112 from which the primary wave 102 is generated. A distance 114 between the source point 112 and the secondary wave observation points 110, 110' may be approximately equal to the depth of the feature for which data is being collected. Thus, a vertical distance 116 between the source point 112 and the first reflection point 106 may be approximately equal to the distance 114 between the source point 112 and the secondary wave observation point 110. Similarly, the depth (not shown) of the additional reflection point 106' may be approximately equal to the distance (not shown) between the source point 112 and the additional secondary wave observation point 110'. Placement of the geophones at the secondary wave observation points 110, 110' may provide an indication of features, such as boundaries 118, 120 between geologic layers 122, 124, 126 of the subterranean formation 100. However, features such as fault 128 lying outside the reflection area may not be observed. Thus, the process may be repeated, with a new seismic generation event at a new source point and data collection at new secondary wave observation points.

SUMMARY OF THE INVENTION

A method of imaging a subterranean formation. The method includes emitting a primary wave from a source point, such that a portion of the primary wave travels into the subterranean formation and is refracted along a geologic layer in the subterranean formation and then emitted as a secondary wave from a refraction point on a boundary between the geologic layer and another geologic layer. The method also includes allowing a portion of the secondary wave to be reflected from a first reflection point as a tertiary wave. The method further includes allowing a portion of the tertiary wave to be reflected from a second reflection point as a quaternary wave, and collecting data about the quaternary wave at an observation point.

DETAILED DESCRIPTION

A method of imaging a subterranean formation may include emitting a primary wave, allowing the wave to refract and reflect multiple times within the subterranean formation, and collecting data about the wave after it has changed direction multiple times.

Figure 1:
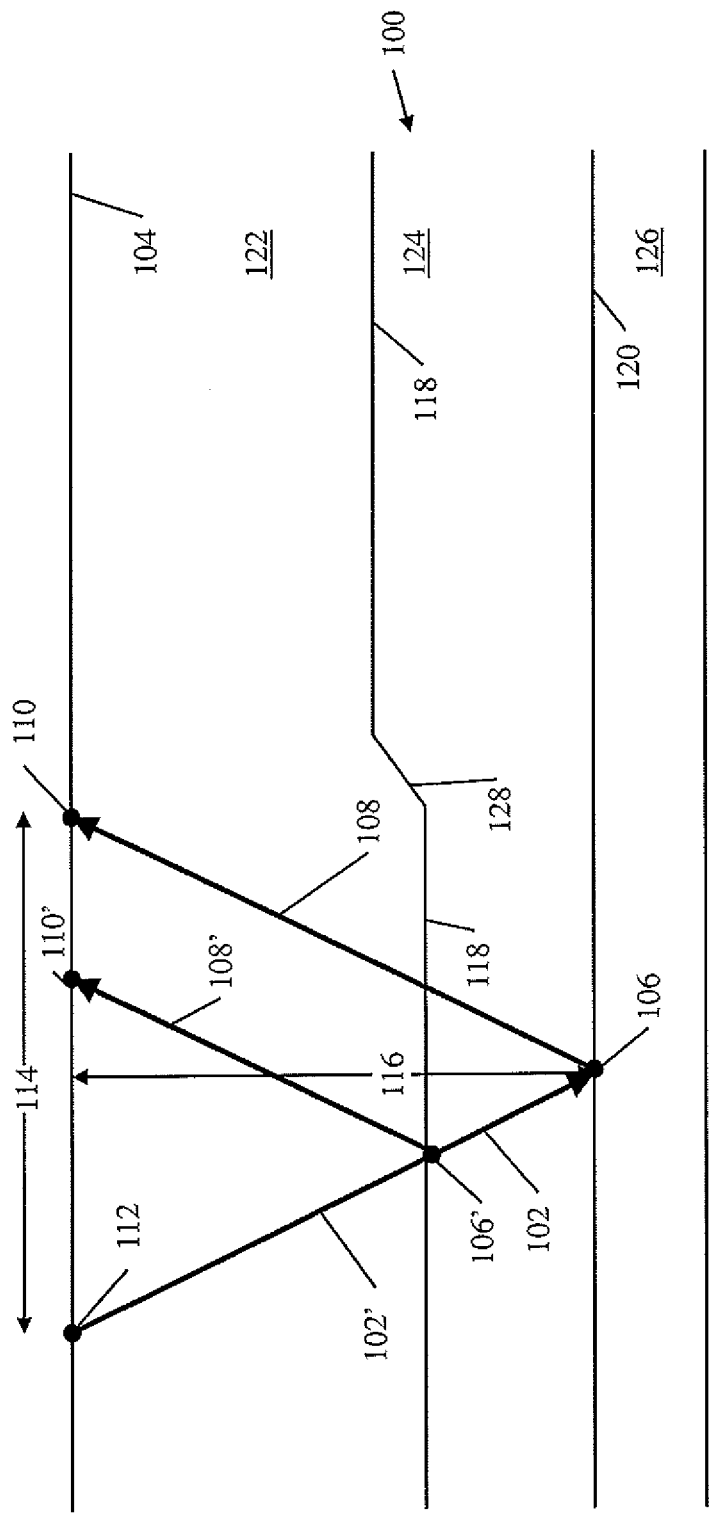
FIG. 1 is a cross sectional side view of a subterranean formation being surveyed using conventional methods.
Figure 2:
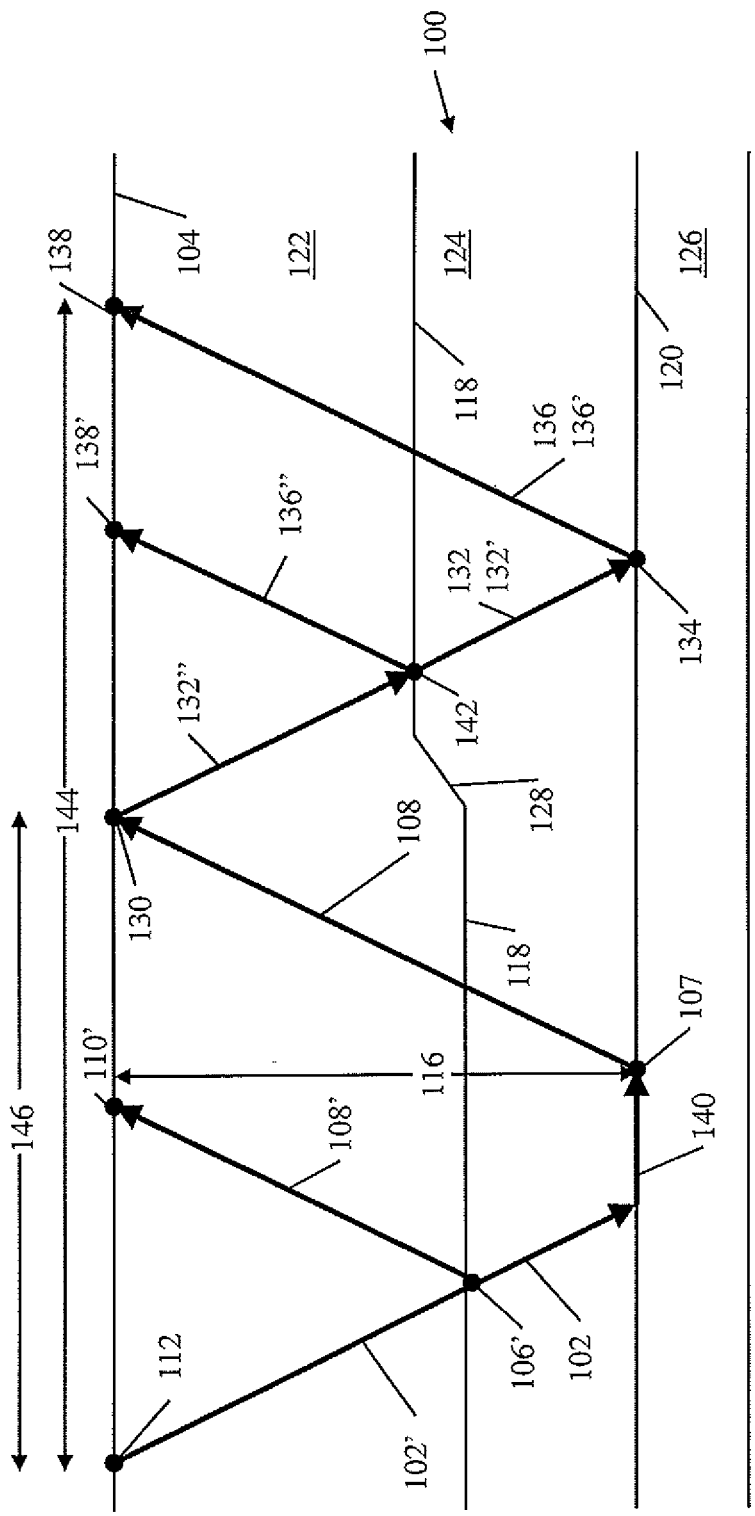
FIG. 2 is a cross sectional side view of another subterranean formation being surveyed using one of the methods of the present disclosure.

Referring now to FIG. 2, a method of imaging a subterranean formation 100 may include emitting a primary wave 102 from a source point 112. Emitting the primary wave 102 may include directing the primary wave 102 downward into the earth, allowing a number of waves, including the primary wave 102, to move radially outward from the source point 112, or otherwise causing the primary wave 102 to enter the earth in a direction toward the subterranean feature of interest. The primary wave 102 may be directed in a manner such that a portion of the primary wave 102 travels into the subterranean formation 100. As illustrated, the primary wave 102 travels downward away from the earth's surface 104 and into the subterranean formation 100. At a refraction point 107, a portion of the primary wave 102 may then be emitted as a secondary wave 108. As illustrated, the refraction point 107 emits the secondary wave 108 upward toward the earth's surface 104. At a first reflection point 130, a portion of the secondary wave 108 may then be reflected as a tertiary wave 132. As illustrated, the first reflection point 130 reflects the tertiary wave 132 downward, away from the earth's surface 104. At a second reflection point 134, a portion of the tertiary wave 132 may then be reflected as a quaternary wave 136. As illustrated, the second reflection point 134 reflects the quaternary wave 136 upward toward the earth's surface 104. Data about the quaternary wave 136 may be collected at an observation point 138. As illustrated, the observation point 138 is on the earth's surface 104.

The source point 112 may be any location from which the primary wave 102 can be emitted. For example, the source point 112 may be an energy source proximate the earth's surface 104. Some examples of source points include dynamite placed slightly below the earth's surface 104, and a vibroseis apparatus (e.g., a vibroseis truck) placed on the earth's surface 104.

The source point 112 may provide compressional energy, for example, via dynamite. Thus emitting the primary wave 102 from the source point 112 may result in the primary wave 102 including a compressional wave. Alternatively, or additionally, the source point 112 may provide other types of energy, resulting in the primary wave 102 including one or more other types of waves, such as a shear wave. The primary wave 102 may enter the earth's surface 104 and travel toward the feature(s) of interest in the subterranean formation 100. In some instances, the primary wave 102 may be refracted over some distance. For example, as illustrated, upon reaching a boundary 120 between two geologic layers 124 and 126, the primary wave 102 may be refracted over a distance 140 before reaching the refraction point 107. At refraction point 107, some of the refracted wave energy is emitted or directed upwards as secondary wave 108 towards the earth's surface 104. Other portions of the refracted wave energy is radiated at other refraction points (not shown). When a portion of the primary wave 102 is refracted or otherwise diverted, the magnitude of the secondary wave 108 may be less than that of the primary wave 102.

The refraction point 107 may lie on the boundary 120 between the two geologic layers 124 and 126 in the subterranean formation 100, as illustrated. Geologic layers defining a boundary, such as boundary 120 may be formed of various types of rock, having various reservoir properties (such as porosity) that affect seismic wave propagation.

The secondary wave 108 may be refracted upward toward the earth's surface 104 at the refraction point 107. The secondary wave 108 may include a compressional wave and may represent a portion of the primary wave 102 refracted by the geologic layer 126 beneath the boundary 120, or otherwise refracted back toward the earth's surface 104.

As the secondary wave 108 moves toward the earth's surface 104, it may approach the first reflection point 130. Thus, the first reflection point 130 may be a point where the secondary wave 108 meets the earth's surface 104. However, the first reflection point 130 may not be exactly at the earth's surface 104 and may lie proximate the earth's surface (e.g., slightly below the earth's surface). Alternately, the first reflection point 130 may lie on a subterranean boundary or elsewhere.

The interaction of the secondary wave 108 with the earth's surface 104, and reflection of a portion thereof at the first reflection point 130 may result in the corresponding tertiary wave 132 having unique characteristics. For example, even if the secondary wave 108 only includes compressional components, the tertiary wave 132 may include a compressional wave, a shear wave, or both, and may represent a portion of the secondary wave 108 reflected by the earth's surface 104 or otherwise reflected back downward into the subterranean formation 100. A portion of the secondary wave 108 may be refracted or otherwise diverted, such that the magnitude of the tertiary wave 132 is less than that of the secondary wave 108. When the tertiary wave 132 includes multiple wave components, each component may be considered a separate wave. Thus, one of the waves generated at the first reflection point 130 may be considered the tertiary wave 132, while another wave generated at the same time may be considered an additional tertiary wave 132'. Thus, if the tertiary wave 132 is a compressional wave, then the additional tertiary wave 132' may be a corresponding shear wave. Similarly, if the tertiary wave 132 is a shear wave, then the additional tertiary wave 132' may be a corresponding compressional wave. In either event, both a compressional wave and a shear wave may be reflected downward from the earth's surface 104 at the first reflection point 130. The tertiary wave or waves 132, 132' may move away from the first reflection point 130 proximate the earth's surface 104 toward the second reflection point 134.

The second reflection point 134 may lie on the boundary 120 between two geologic layers 124 and 126 as illustrated, which boundary 120 may also be the location of the refraction point 107. Alternatively, the second reflection point 134 may lie on a different boundary between geologic layers, or proximate another geologic feature. For example, the second reflection point 134 may lie on a second boundary 118 between geologic layers 122 and 124 in the subterranean formation 100. Such placement may be similar to that of an additional reflection point 142 described below. Likewise, the second reflection point 134 and/or any of the other reflection points may lie at various boundaries or at other features in the subterranean formation 100.

The quaternary wave 136 may include a compressional wave, a shear wave, or both, and may represent a portion of the tertiary wave 132 reflected by the second reflection point 134 upward toward the earth's surface 104. A portion of the tertiary wave 132 may be refracted or otherwise diverted, such that the magnitude of the quaternary wave 136 is less than that of the tertiary wave 132. When the quaternary wave 136 includes multiple wave components, each component may be considered a separate wave. Thus, one of the waves generated at the second reflection point 134 may be considered the quaternary wave 136, while another wave generated at the same time may be considered an additional quaternary wave 136'. Thus, if the quaternary wave 136 is a compressional wave, then the additional quaternary wave 136' may be a corresponding shear wave. Similarly, if the quaternary wave 136 is a shear wave, then the additional quaternary wave 136' may be a corresponding compressional wave. In either event, both a compressional wave and a shear wave may be reflected upward toward the earth's surface 104 at the second reflection point 134. The quaternary wave or waves 136, 136' may move away from the second reflection point 134 toward the earth's surface 104.

Once the primary wave 102 has been refracted and then reflected at two reflection points, e.g., 130 and 134 (going through transformation to the secondary wave, tertiary wave, and quaternary wave), it may be observed at the observation point 138. Thus, data may be collected on the energy after a refraction and two reflections, as opposed to just one reflection. The primary wave 102 may go through more than three reflections resulting in additional transformation into an "nth wave" which can be observed in a similar manner for data collection after any larger number of reflections.

The observation point 138 may be a point proximate the earth's surface 104 in a location useful for collecting data. For example, the observation point 138 may be the point at which a geophone is placed to collect data after multiple reflections of the primary wave 102. The geophones, receivers, or other data collection apparatus may be placed at the observation point 138 in advance of emission of the primary wave 102 and may be used to record any of a number of waves, including the primary wave 102 in a direct form, the primary wave 102 after one refraction (e.g., the secondary wave 108), the primary wave 102 after one reflection or alternate refraction (e.g., additional secondary wave 108'), the primary wave 102 after a refraction and two reflections (e.g., the quaternary wave or waves 136, 136'), or the primary wave 102 after more than three reflections (e.g., the nth wave or waves). Thus, data about the quaternary wave 136 may be collected at the observation point. Simultaneously, or in rapid succession, data about the additional quaternary wave 136' may be collected at the observation point. Thus information may be collected about compressional waves and shear waves, both of which were initiated by the instigation of the primary wave 102. In addition to the observation point 138, additional or alternative observation points may be provided to collect data, either prior to or after the existence of a quaternary wave. For example, data about the secondary wave 108 may be collected at an additional observation point 110 prior to or following reflection at the interaction at the first reflection point 130.

Any number of the points and waves mentioned may be supplemented or substituted with waves originating at different reflection points. For example, another portion 132" of the tertiary wave 132 may be reflected from the additional reflection point 142 as an additional quaternary wave 136". As with the other quaternary waves 136 and 136', data about the additional quaternary wave 136" may be collected at an observation point (e.g., additional observation point 138'). Notably, while additional observation point 138' is illustrated as being on a first side of the observation point 138, additional observation point 138' may alternatively be on the other side of the observation point 138. Likewise, the additional quaternary wave 136" may have a different location than the one illustrated.

Depending on the characteristics of the subterranean formation 100, a distance 146 between the source point 112 and the first reflection point 130 may be approximately equal to or greater than a distance 116 between the source point 112 and the refraction point 107. In some instances, the distance 146 may be one to five times greater than the distance 116. For example, the distance 144 between the source point 112 and the observation point 138 may be more than double, triple, quadruple, or even quintuple the distance 146 between the source point 112 and the first reflection point 130.

The collection of data after multiple reflections may allow for an increased distance 144 between the source point 112 and the observation point 138. This is in contrast to conventional reflection seismic methods, where the distance 146 is typically less than or equal to the distance 116. The methods described herein may result in the distance 144 being one to five times (or more) the distance 114 typically used in conventional recording. Such increased distance 144 between the source point 112 and the observation point 138 may provide any of a number of advantages. For example, when the distance 144 is larger than the distance 114, there may be less noise interference with equipment, a reduced need for introduction of energy (e.g., fewer dynamite shots) which can reduce disruptions to the environment, increased accuracy in data collection resulting from measurements of multiple waves, increased amount of information in data collection resulting from creation of "free" shear waves in addition to compressional waves using just a compressional source, time saving by reducing need to move observation points to lie within a short distance of the source point, increased coverage in riparian areas where it is acceptable to place receivers but not shots. The locations of the observation points may be at any distance 144 from the source points and any elevation relative to the earth's surface.

Once data has been collected from the observation point 138, that data may be used to image or map the subsurface formation 100. Thus, mapping of the subsurface formation 100 may rely on data collected from waves after those waves have been reflected at least twice. Such mapping may then be used in making decisions related to extracting resources (e.g., oil, gas, or other hydrocarbons) from the subterranean formation 100.

While one emission event (e.g., dynamite explosion) is described as providing the primary wave 102 and all associated waves originating from the primary wave 102, additional emission events may be provided at the source point 112 and/or additional source points. Thus, the primary wave 102 described may be considered a "first" primary wave and additional primary waves may be provided as "second," "third," "fourth," etc. primary waves, with the associated derivative waves having similar designations.

Those of skill in the art will appreciate that many modifications and variations are possible in terms of the disclosed embodiments, configurations, materials, and methods without departing from their scope. Accordingly, the scope of the claims and their functional equivalents should not be limited by the particular embodiments described and illustrated, as these are merely exemplary in nature and elements described separately may be optionally combined.

The invention claimed is:

1. A method of imaging a subterranean formation, comprising:
   emitting a primary wave from a source point, such that a portion of the primary wave travels into the subterranean formation and is refracted along a geologic layer in the subterranean formation and then emitted as a secondary wave from a refraction point on a boundary between the geologic layer and another geologic layer;
   allowing a portion of the secondary wave to be reflected from a first reflection point as a tertiary wave;
   allowing a portion of the tertiary wave to be reflected from a second reflection point as a quaternary wave;
   collecting data about the quaternary wave at an observation point; and
   using the data about the quaternary wave to image or map the subterranean formation.

2. The method of claim 1, wherein emitting the primary wave comprises providing compressional energy, such that the primary wave comprises a compressional wave.

3. The method of claim 1, comprising:
   allowing another portion of the secondary wave to be reflected from the first reflection point as an additional tertiary wave;
   wherein the tertiary wave comprises a compressional wave; and
   wherein the additional tertiary wave comprises a shear wave.

4. The method of claim 3, comprising:
   allowing another portion of the tertiary wave to be reflected from the second reflection point as an additional quaternary wave;
   wherein the quaternary wave comprises a compressional wave; and
   wherein the additional quaternary wave' comprises a shear wave.

5. The method of claim 4, comprising collecting data about the additional quaternary wave at the observation point.

6. The method of claim 1, wherein the first reflection point is proximate the earth's surface.

7. The method of claim 1, wherein the observation point is proximate the earth's surface.

8. The method of claim 1, wherein the second reflection point lies on the boundary.

9. The method of claim 1, wherein the second reflection point lies on a second boundary between geologic layers in the subterranean formation.

10. The method of claim 1, wherein the primary wave is refracted along a distance before reaching the refraction point.

11. The method of claim 1, comprising:
    allowing another portion of the tertiary wave to be reflected from an additional reflection point as an additional quaternary wave; and collecting data about the additional quaternary wave at an additional observation point.

12. The method of claim 1, comprising:
collecting data about the secondary wave at an additional observation point.

13. The method of claim 1, wherein a distance between the source point and the observation point is greater than a distance between the source point and the first reflection point.

14. The method of claim 13, wherein the distance between the source point and the observation point is greater than double the distance between the source point and the first reflection point.

15. The method of claim 13, wherein the distance between the source point and the observation point is greater than triple the distance between the source point and the first reflection point.

16. The method of claim 13, wherein the distance between the source point and the observation point is greater than quadruple the distance between the source point and the first reflection point.

17. The method of claim 13, wherein the distance between the source point and the observation point is greater than quintuple the distance between the source point and the first reflection point.

* * * * *